United States Patent
Ito et al.

(10) Patent No.: US 6,376,777 B1
(45) Date of Patent: Apr. 23, 2002

(54) GROMMET

(75) Inventors: Takanori Ito; Takashi Suzuki; Satoshi Amihiro, all of Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/577,164

(22) Filed: May 24, 2000

(30) Foreign Application Priority Data

May 27, 1999 (JP) .......................................... 11-147839

(51) Int. Cl.$^7$ ............................................... H01B 17/26
(52) U.S. Cl. ........................ 174/152 G; 174/65 G; 174/167; 16/2.1; 248/56; 439/567
(58) Field of Search ....................... 174/31 R, 65 R, 174/65 G, 151, 152 G, 153 G, 153 R, 167; 248/56; 439/567; 16/2.1

(56) References Cited

U.S. PATENT DOCUMENTS

| | | | | |
|---|---|---|---|---|
| 2,420,826 A | * | 5/1947 | Irrgang | 174/153 G |
| 2,459,370 A | * | 1/1949 | Ferguson et al. | 174/153 G |
| 2,573,600 A | * | 10/1951 | Pruehs | 174/153 G |
| 2,920,129 A | * | 1/1960 | Rapata | 174/153 G |
| 2,922,836 A | * | 1/1960 | Brown | 174/153 G |
| 3,229,026 A | * | 1/1966 | Sulzer | 174/65 G |
| 3,366,356 A | * | 1/1968 | Fisher | 248/56 |
| 3,499,097 A | * | 3/1970 | Widstrand | 174/65 G |
| 3,562,847 A | * | 2/1971 | Jemison | 16/2.1 |
| 3,627,904 A | * | 12/1971 | Milne | 174/65 R |
| 3,749,818 A | * | 7/1973 | Jemison | 174/153 G |
| 4,535,196 A | * | 8/1985 | Milne | 16/2.1 |
| 4,860,791 A | * | 8/1989 | Putnam | 137/565 |
| 4,945,193 A | | 7/1990 | Oikawa et al. | |
| 5,504,973 A | * | 4/1996 | Kameyama | 174/153 G |
| 5,693,910 A | * | 12/1997 | Gretz | 174/65 G |
| 5,981,877 A | | 11/1999 | Sakata et al. | |
| 6,058,562 A | | 5/2000 | Satou et al. | |
| 6,248,952 B1 | * | 6/2001 | Reeves et al. | 174/65 R |
| 6,297,449 B1 | * | 10/2001 | Dagtekin | 174/65 G |

* cited by examiner

Primary Examiner—Dean A. Reichard
Assistant Examiner—Adolfo Nino
(74) Attorney, Agent, or Firm—Greenblum & Bernstein, P.L.C.

(57) ABSTRACT

The present invention provides a grommet with a grommet body having an insertion aperture into which a corrugated tube is inserted, and a slit extending from the insertion aperture to an outer peripheral surface of the grommet body so that the slit can be opened and closed. Facing surfaces of the grommet body on opposite sides of the slit are inclined at a predetermined angle with respect to a line coextensive with a central axis of the insertion aperture. The outer peripheral surface of the body is also inclined at the same predetermined angle with respect to the line. The present invention makes it easier to mount a corrugated tube to the insertion aperture of the grommet body by using the slit, and thus improves efficiency of the mounting operation. In addition, after mounting the corrugated tube, the slit is tightly closed, and thus waterproofness and soundproofness of the grommet are not adversely affected.

10 Claims, 8 Drawing Sheets

GROMMET

BACKGROUND OF THE INVENTION

1. Field of Invention

This invention relates to a grommet. In particular, this invention relates to a grommet that prevents a wire harness from scraping against an opening of an automobile body panel, when a corrugated tube holding the wire harness is being inserted into the opening. This invention further relates to a grommet that prevents intrusion of water, moisture and sound through the opening of the automobile body panel into the inside of the automobile panel.

2. Description of Related Art

Conventionally, a grommet is used to prevent a wire harness from scraping against an opening in an automobile body panel when a corrugated tube holding the wire harness is being inserted into the opening. The grommet is also used to prevent intrusion of water, moisture and sound into the inside of the automobile body panel through a gap between the opening in the automobile body panel and the corrugated tube.

FIGS. 7(a) and 7(b) are drawings to explain an example of a conventional grommet into which a corrugated tube is inserted. In FIGS. 7(a) and 7(b), a circular trough 1a and a circular ridge 1b are alternatingly provided around the outer peripheral surface of the corrugated tube 1. A wire harness 2 is inserted into the inner periphery of the corrugated tube.

In FIG. 7(b), a grommet 3 is provided with a large-diameter tapered portion 5 and a small-diameter cylindrical portion 6 that extends from the tapered side of the large-diameter tapered portion 5 and is sized so that the corrugated tube 1 can be inserted. The tapered portion 5 has a circular recess 5a around an outer peripheral surface at the enlarged side of the tapered portion 5 for engaging with a mounting hole 4a provided in an automobile body panel medium 4.

Generally, the small-diameter cylindrical portion 6 is positioned outside of a passenger compartment. The corrugated tube 1 is fixed to the grommet 3 by wrapping a tape 7 around a connection between the corrugated tube 1 and the small-diameter cylindrical portion 6. Thus, since the grommet 3 is mounted between the corrugated tube 1 and the panel 4, the grommet 3 can hold the corrugated tube 1 such that intrusion of water, moisture or sound is prevented. In addition, a wire harness 2 can be wired inside and outside of the passenger compartment through the mounting hole 4a in the panel 4.

However, with the conventional grommet 3, the corrugated tube 1 is inserted into the small-diameter cylindrical portion 6 and fixed to the grommet only by wrapping a tape around the connection between the corrugated tube 1 and the small-diameter cylindrical portion 6. Therefore, the corrugated tube 1 easily slides in an axial direction of the corrugated tube 1. In addition, the wire harness 2 might also slide in an axial direction of the corrugated tube due to the sliding of the corrugated tube. Thus, a layout of the wire harness may become out of position.

To resolve this problem, the number of turns of the tape 7 wrapping around the connection between the small-diameter cylindrical portion 6 and the corrugated tube 1 is increased. However, this method requires a difficult mounting task and takes a long time. Accordingly, the efficiency of the mounting of the corrugated tube 1 is reduced.

FIGS. 8(a) and 8(b) show a grommet developed by the inventors of the present invention to resolve the problem described above. In FIGS. 8(a) and 8(b), a grommet 11 is provided with a grommet body that has a recess 13a around the outer peripheral surface to engage with an opening 12a formed in an automobile body panel 12.

In addition, the grommet body 13 has an insertion aperture 13b to insert the corrugated tube 1 therein. A circular ridge 14a and a circular trough 14b are provided alternatingly around the inner peripheral surface of the grommet body 13 surrounding the insertion aperture 13b. The circular ridge 14a and the circular trough 14b engage with circular trough 1a and circular ridge 1b of the corrugated tube 1, respectively.

Due to the structure of the grommet 11, when the corrugated tube 1 is being inserted into the insertion aperture 13b, a diameter-expanding machine (not shown) is inserted into the insertion aperture 13b to expand the insertion aperture 13b in a radial direction. Then, the corrugated tube 1 is inserted into the insertion aperture 13b. The circular ridge 14a and the circular trough 14b respectively engage with the circular trough 1a and the circular ridge 1b of the corrugated tube 1. Thus, the corrugated tube 1 is prevented from sliding in an axial direction of the corrugated tube against the grommet 11.

Thus, the grommet 11 must be used with a diameter-expanding machine, which is inserted into the insertion aperture 13b to expand the insertion aperture 13b in a radial direction, when the corrugate tube 1 is inserted to the insertion aperture 13b. Accordingly, the diameter-expanding machine is always required. In addition, the number of operative steps required for the insertion task increases. Therefore, further improvement is required.

Accordingly, the object of the present invention is to make it easier to mount a corrugated tube into an insertion aperture of a grommet through a slit, and thus, to improve the efficiency of the mounting task for the corrugated tube, while waterproofness and soundproofness of the grommet are not adversely affected, by tightly closing the slit after mounting the corrugated tube.

SUMMARY OF THE INVENTION

To achieve the above and/or other goals, the present invention provides a grommet into which a corrugated tube having a circular ridge and a circular trough alternatingly on an outer peripheral surface of the corrugated tube is mounted. The grommet includes a body having a recess around at least part of an outer peripheral surface thereof and an insertion aperture into which the corrugated tube is insertable. The recess is engageable with an opening provided in a panel. The body also has at least one trough and at least one ridge provided on an inner peripheral surface surrounding the insertion aperture. The trough and the ridge of the body are respectively engageable with the circular ridge and the circular trough of the corrugated tube. The body further includes a slit extending from the insertion aperture to the outer peripheral surface of the body so that the slit can be opened and closed. Facing surfaces of the body on opposite sides of the slit are inclined at a predetermined angle with respect to a line within a plane coextensive with the central axis of the of the insertion aperture. The outer peripheral surface of the body is also inclined at the same predetermined angle with respect to the line.

In another aspect of the present invention, there is provided a grommet to receive a tube. The grommet that includes a grommet body having a generally planar portion, a curved portion and tapered portions in an outer peripheral surface, and an insertion aperture to insert a corrugated tube. Each of the tapered portions extends between an end of the plane portion and an end of the curved portion. The tube may be a smooth-wall tube or a corrugated tube having a circular trough and a circular ridge alternatingly on an outer surface of the corrugated tube. The grommet body also has a slit extending from the insertion aperture to the plane portion. Facing surfaces of the grommet body on opposite sides of the slit are inclined at predetermined angle with respect to a line perpendicular to the central axis of the insertion aperture. The tapered portions are also inclined at the predetermined angle with respect to the line.

In the above described cases, since a slit is provided that extends from the insertion aperture to the outer peripheral surface of the grommet body, and the facing surfaces of the grommet body on opposite sides of the slit can be separated, the tube is easily mounted into the insertion aperture through the slit. In addition, after mounting of the tube, the facing surfaces are contacted, i.e., the slit is closed; thus, the tube is prevented from slipping out from the insertion aperture.

Since the surfaces on opposite sides of the slit faces and are inclined at a predetermined angle with respect to a line perpendicular to the axis of the insertion aperture, and the outer peripheral surface of the grommet body is inclined at the same predetermined angle with respect to the line, the facing surfaces of the grommet body on opposite sides of the slit can tightly contact one another when the grommet body engages with a groove in a panel medium. Accordingly, water, moisture and sound are prevented from entering into the insertion aperture through the slit; thus, waterproofness and soundproofness are not adversely affected.

In addition, since the facing surfaces are inclined at the predetermined angle with respect to the line perpendicular to the axial direction of the insertion aperture, the width of the gap of the slit can be wider. Accordingly, when the grommet body is molded using a die, the die cutting for the slit can be performed easily. Thus, the molding operation of the grommet body becomes easier.

In another aspect of the present invention, to resolve the problem described above, there is provided a grommet that has a tongue on at least one surface of the grommet body where an end of the insertion aperture is located. The tongue extends from an edge of the insertion aperture. The corrugate tube can be fixed to the tongue by wrapping a tape therearound.

In this case, since the corrugated tube can be fixed to the tongue by wrapping a tape therearound, the corrugated tube is fixed to the grommet more firmly.

In accordance with a further aspect of the present invention, to resolve the problem described above, there is provided a grommet that includes a tongue having a ridge and a trough alternatingly there along. The ridge and the trough respectively engage with the circular trough and the circular ridge of the corrugated tube.

In this case, in addition to fixing the corrugated tube by wrapping a tape, the ridge and the trough provided on a surface of the tongue can engage with the circular trough and the circular ridge, respectively. Thus, the corrugated tube is prevented from sliding in an axial direction of the insertion aperture of the grommet body.

In another aspect of the present invention, there is provided a method for mounting a corrugated tube having an alternating ridge and trough in an outer peripheral surface of the corrugated tube into an insertion aperture of a grommet. The method includes opening a slit provided in the grommet. The slit extends from the insertion aperture to an outer peripheral surface of the grommet. The corrugated tube is then inserted into the insertion aperture through the slit. The position of the corrugated tube is adjusted so that the corrugated tube is located on a tongue. The tongue is provided on a surface of the grommet, and the surface includes an end of the insertion aperture. Next, a tape is wrapped around the corrugated tube and the tongue. Lastly, the slit is closed by engaging a recess provided in the outer peripheral surface of the grommet with a panel opening.

According to the method described above, a diameter-expanding machine is not required and the mounting operation of the corrugated tube to the grommet is simplified by using the slit.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF PREFERRED EMBODIMENTS

Embodiments of the present invention are explained in the following with reference to figures.

FIGS. 1 through 5 illustrate a first embodiment of the present invention.

Figure 1:
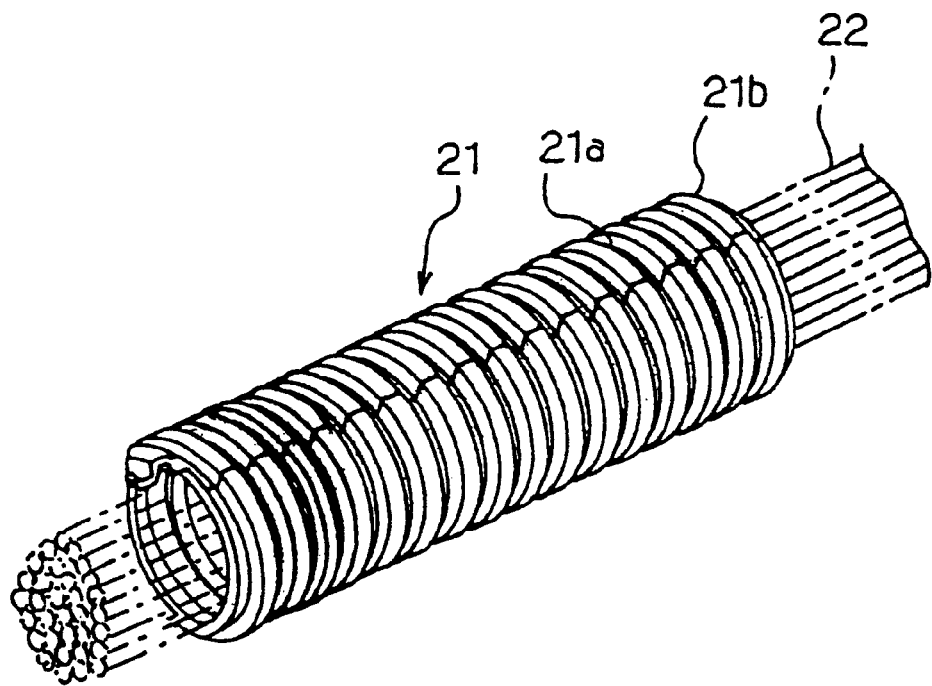
FIG. 1 is a perspective view illustrating a corrugated tube to be mounted on a grommet according to an embodiment of the present invention.
Figure 2:
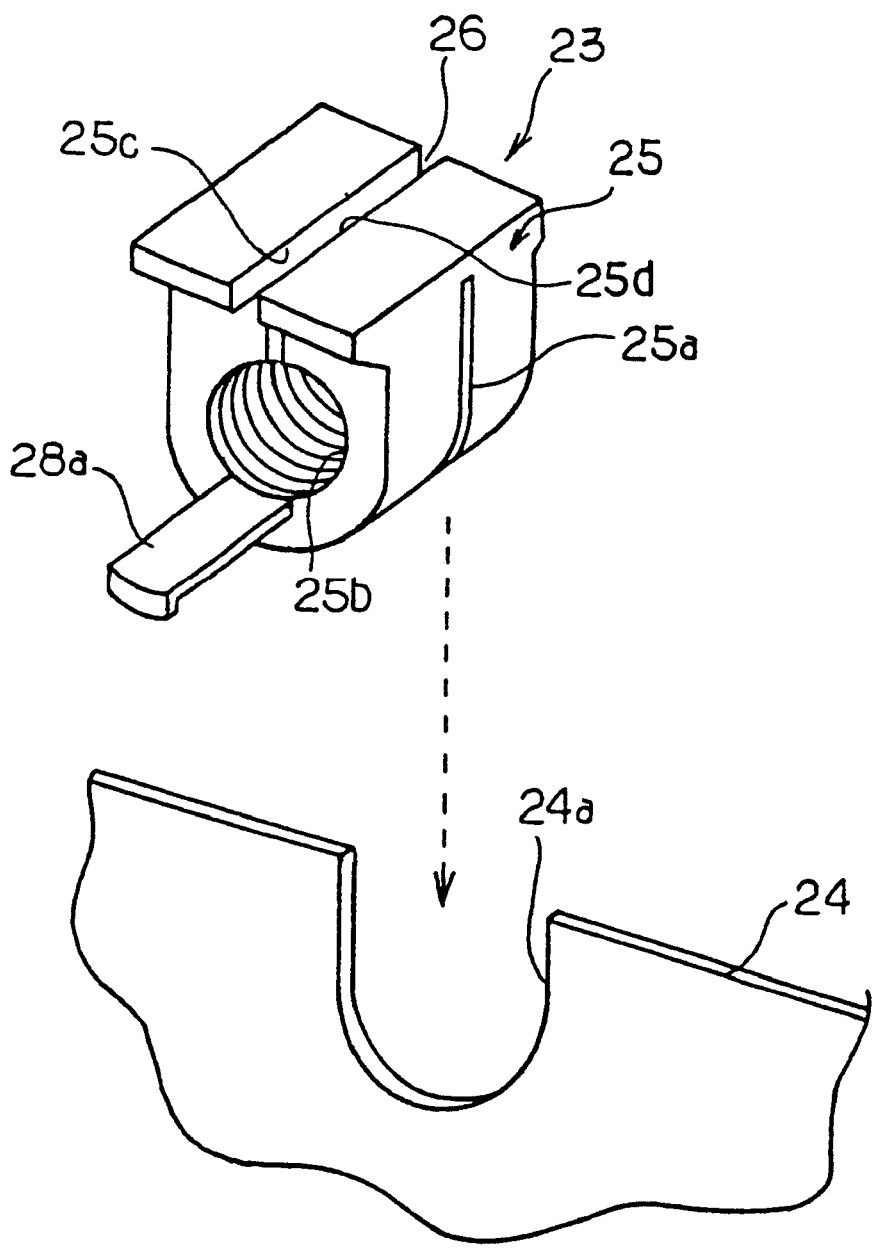
FIG. 2 is a perspective view showing the grommet and an automobile body panel according to a first embodiment of the present invention.

In FIG. 1, a corrugated tube 21 has a circular trough 21$a$ and a circular ridge 21$b$ alternatingly around the outer peripheral surface. In addition, the corrugated tube 11 has an opening along the longitudinal direction into which a wire harness 22 is inserted.

In FIGS. 2 through 5(b), a grommet 23 is provided with a grommet body 25 having a recess 25a around the outer peripheral surface. The recess 25a engages with an opening 24a formed in an automobile body panel 24. The automobile body panel 24 is positioned to divide the inside and outside of a passenger compartment of an automobile.

Figure 4A:
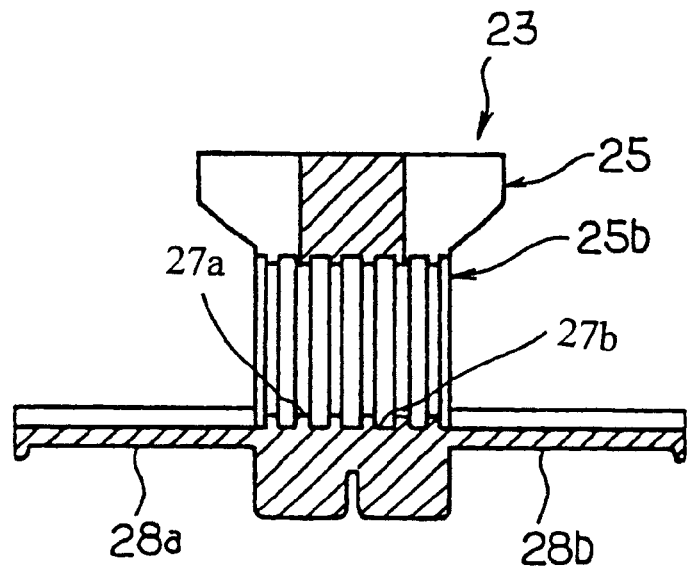
FIGS. 4($a$) and 4($b$), respectively, show a cross-sectional view of the grommet viewed from the direction A—A of FIG. 3($a$), and an enlarged cross-sectional view thereof in a condition when a corrugated tube is inserted into the insertion aperture of the grommet body.
Figure 4B:
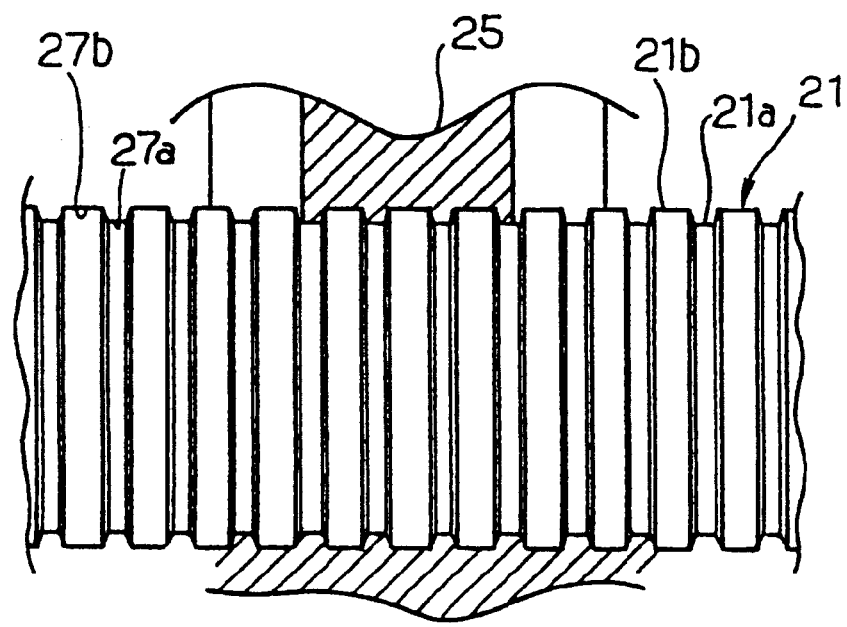

The grommet body 25 has an insertion aperture 25b. As shown in FIGS. 4(a) and 4(b), a circular ridge 27a and a circular trough 27b are provided alternatingly on the inner peripheral surface of the grommet body 25 around the insertion aperture 25b. The circular ridge 27a and the circular trough 27b engage with the circular trough 21a and the circular ridge 21b provided on the corrugated tube 21, respectively.

The upper side of the grommet body 25 is formed to have a planar shape. The grommet body has slit 26 along the axial direction of the insertion and extends from the upper side plane to the insertion aperture 25b. The slit 26 provides opening surfaces 25c and 25d of the grommet body 25, which can be separated from, and placed into contact with, one another. Thus, the grommet body 25 can be opened and closed.

Figure 3A:
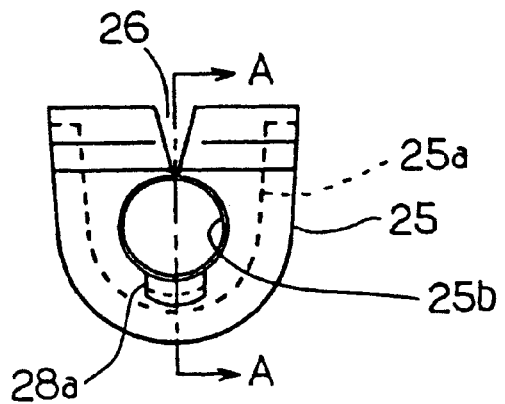
FIGS. 3($a$), 3($b$) and 3($c$), respectively, show a front elevation view, a side elevation view, and a top view of the grommet according to the first embodiment of the present invention.
Figure 3B:
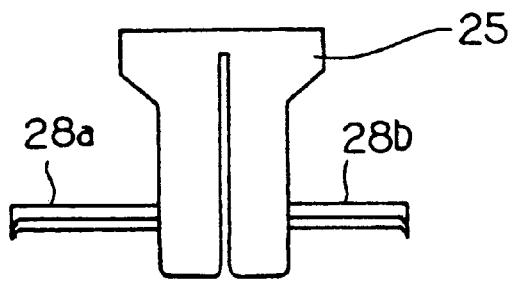
Figure 3C:
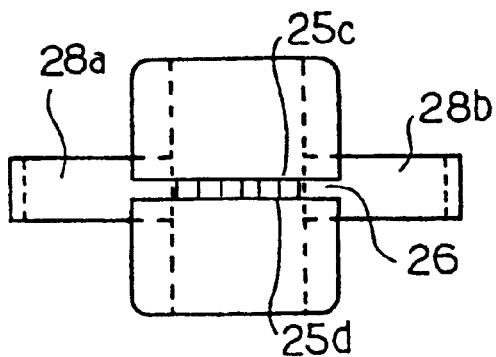

As shown in FIG. 3(b), the grommet body 25 has a pair of tongues 28a and 28b, respectively provided on opposite surfaces of the grommet body 25, in each of which an end of the insertion aperture 25b is positioned. Each of the tongues is extending from an edge of the insertion aperture 25b. The corrugated tube 21 is fixed to the tongues 28a and 28b by wrapping tape therearound (not shown).

Figure 5A:
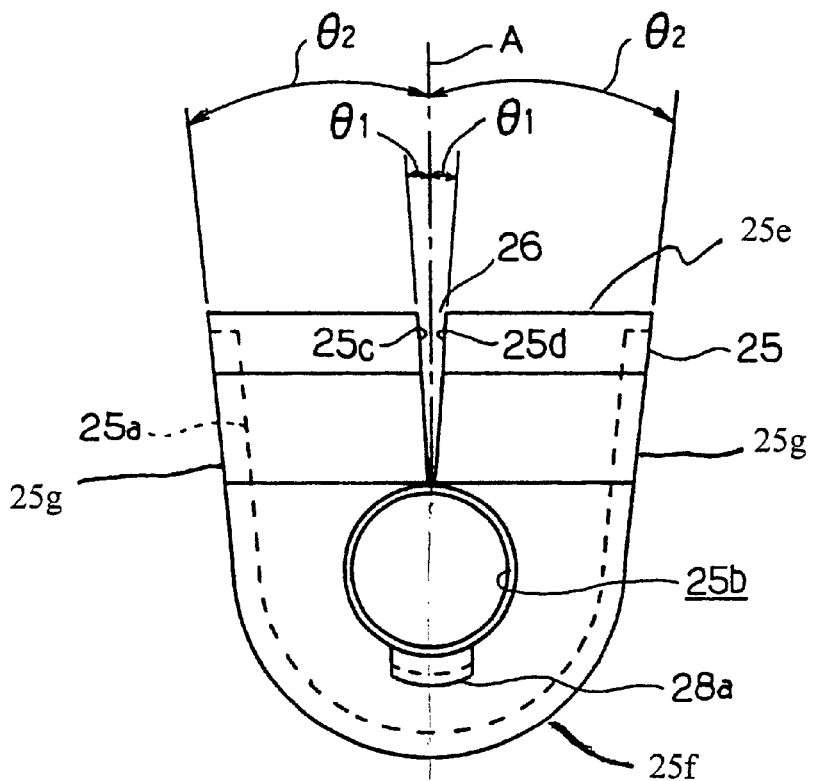
FIGS. 5($a$) and 5($b$), respectively, show a front elevation view of the grommet before mounting, and a front elevation view of the grommet when the grommet is mounted on the automobile body panel according to the embodiment of the present invention.

FIG. 5(a) shows the grommet viewed from the axial direction of the insertion aperture. As shown in FIG. 5(a), the outer peripheral surface of the grommet has a generally planar portion 25e, a curved portion 25f and inclined portions 25g. Each of the inclined portions extends between an end of the planar portion and an end of the curved portion. The opening surfaces 25c and 25d face one another and are each inclined at an angle of $\theta 1$, which is between one and five degrees in this embodiment, with respect to a line A. The line A lies on a plane coextensive with a central axis of the insertion aperture 25b and bisecting the grommet body 25. In addition, the outer peripheral surface of the grommet body 25 is also inclined at an angle of $\theta 2$, which is about the same angle as the angle of $\theta 1$, with respect to the line A. In other words, the opening surfaces 25c and 25d on opposite sides of the slit 26 and the inclined portions of the outer peripheral surface of the grommet body 25 are formed to have a tapered shape.

In the grommet 23, which has the construction described above, the opening surfaces 25c and 25d are separated from one another when the corrugated tube 21 is mounted into the insertion aperture 25b through the slit 26. Then, the circular ridges 27a and the circular troughs 27b engage with the circular troughs 21a and circular ridges 21b of the corrugated tube, respectively (as shown in FIG. 4(b)). Subsequently, the opening surfaces 25c and 25d, which form a tapered opening, contact one another to close the slit 26. The corrugated tube 21 is fixed to the tongues 28a and 28b by tapes. According to the process described above, the corrugated tube 21 is mounted to the grommet 23.

The wire harness 22 is fixed to the automobile body panel 24 via the corrugated tube 21 and the grommet 23 by engaging the recess 25a of the grommet body 25 with an opening 24a in an automobile body panel 24. Thus, a wiring extending from the outside to the inside of a passenger compartment is provided (referring to FIG. 5(b)).

As described above, according to the first embodiment, the grommet body 25 has the slit 26 extending from the upper surface of the grommet body 25 to the insertion aperture 25b. The facing opening surfaces 25c and 25d of the body 25 on opposite sides of the slit 26 are separated from one another when the corrugated tube 21 is being mounted into the insertion aperture 25b through the slit. Thus, the corrugated tube 21 is easily mounted in the insertion aperture 25b. After the corrugated tube 21 is mounted, the opening surfaces 25c and 25d contact each other so as to close the slit 26. Thus, the corrugated tube 21 is prevented from slipping out of the insertion aperture 25b.

Figure 5B:
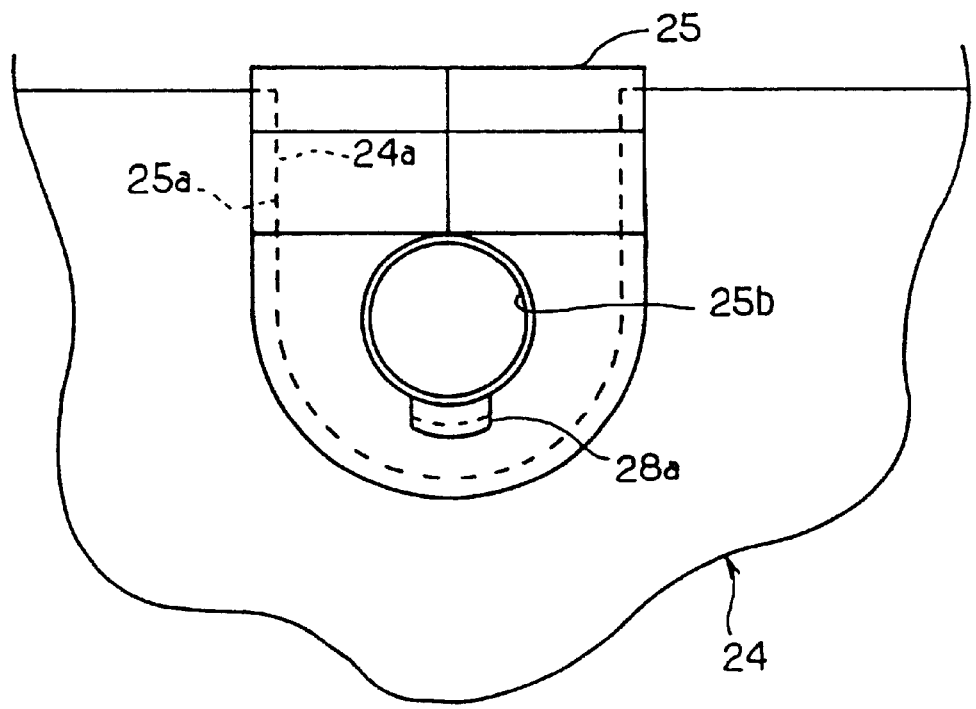

Further, the opening surfaces 25c and 25d face each other and are inclined in opposite directions at an angle $\theta 1$, of between one and five degrees, with respect to the line A, which lies in the plane coextensive with the central axis of the insertion aperture 25b. In addition, the outer peripheral surfaces of the grommet 25, in which the recess 25a is provided, are also inclined in opposite directions at an angle of $\theta 2$, which is about the same angle as $\theta 1$ with respect to the line A. Therefore, as shown in FIG. 5(b), when the grommet body 25 of the grommet engages with the opening 24b of the automobile body panel 24, the opening surfaces 25c and 25d can tightly contact each other. Accordingly, water, moisture and sound are prevented from entering into the insertion aperture 25b through slit 26. Thus, waterproofness and soundproofness are not adversely affected.

Further, the opening surfaces 25c and 25d are inclined at a predetermined angle of $\theta 1$ with respect to the line A, which lies in a plane coextensive with a central axis of the insertion aperture 25b, the slit 26 can be opened to form a wide gap. Accordingly, when the grommet body 25 is molded using a die, die cutting for the slit 26 can be performed easily. Thus, the molding operation of the grommet body 25 becomes easier.

Further, since tongues 28a and 28b are respectively provided on opposite surfaces of the grommet body 25, and extending from opposite edges of the insertion aperture 25b, and the corrugated tube 21 is fixed to the tongues 28a and 28b by wrapping tape therearound, the corrugated tube 21 is firmly fixed to the grommet body 25.

In the first embodiment, the tongues 28a and 28b are respectively provided on opposite surfaces of the grommet body, and extending from edges of the insertion aperture. However, it is possible to provide only one tongue on one of the opposite surfaces.

Figure 6:
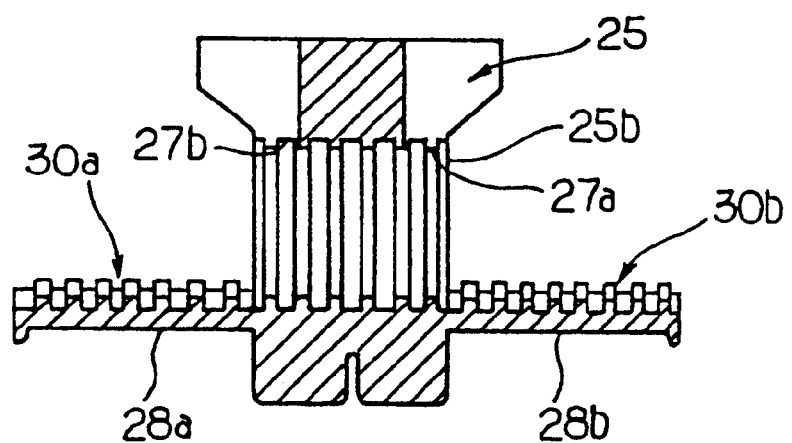
FIG. 6 is a cross-sectional view of a grommet having another shape of the tongue according to another embodiment of the present invention.
Figure 7A:
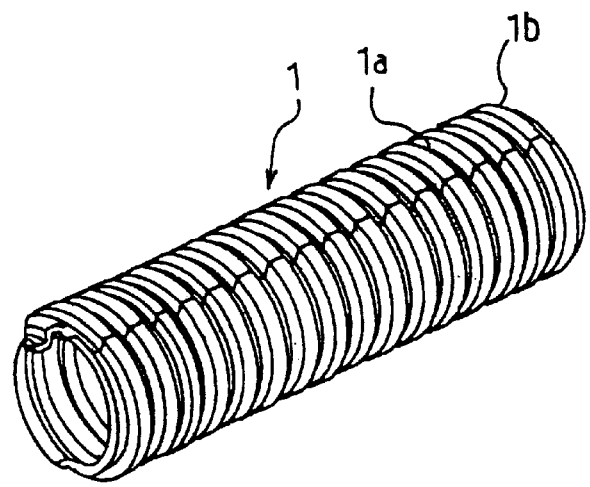
FIGS. 7($a$) and 7($b$) are, respectively, perspective views illustrating an example of a corrugated tube, and an example of a conventional grommet mounted on the corrugated tube.
Figure 7B:
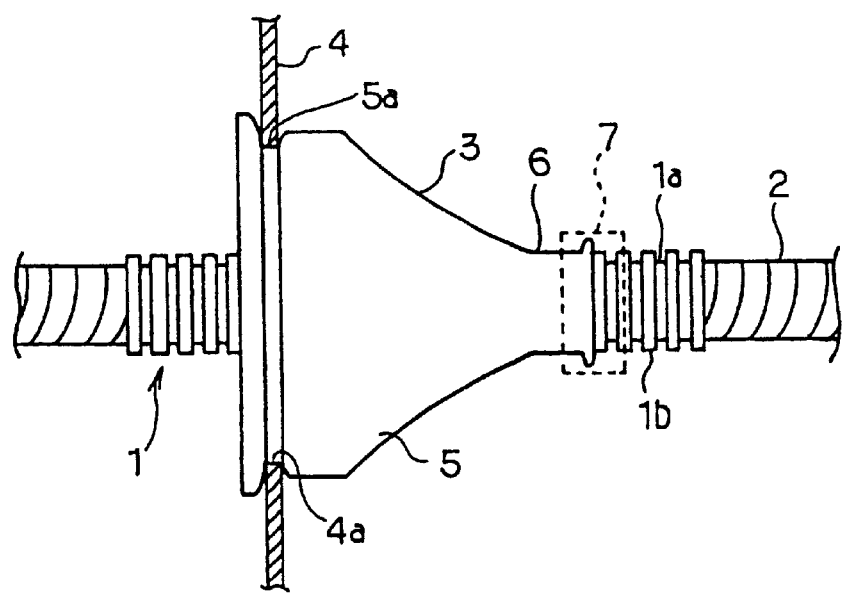
Figure 8A:
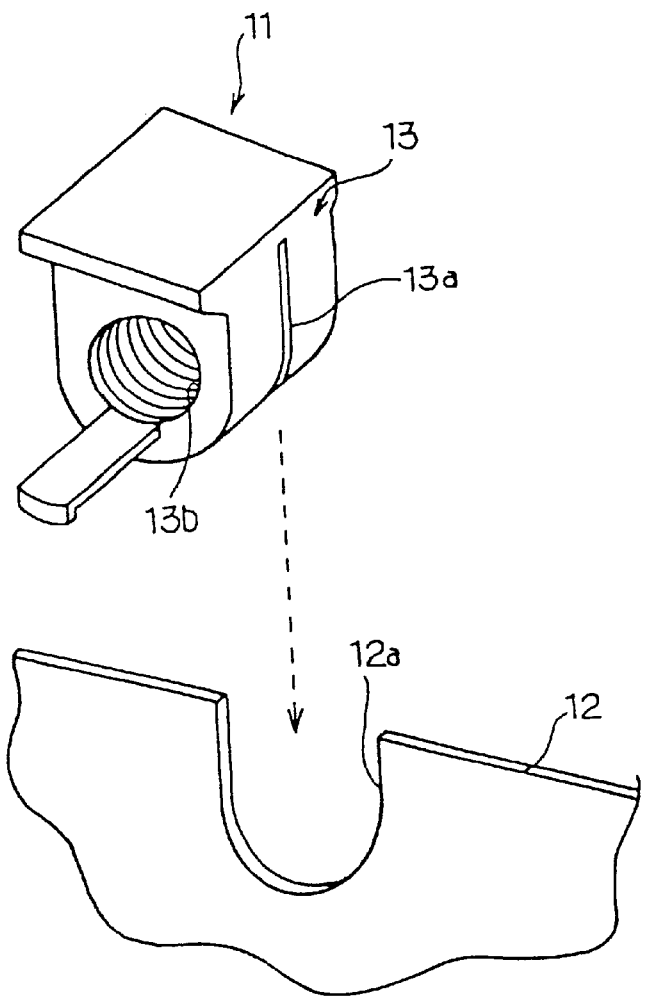
FIGS. 8($a$) and 8($b$), respectively, show a perspective view of a grommet developed by the inventors of the present invention, with an automobile body panel to be engaged with the grommet, and an enlarged cross-sectional view illustrating a body of the grommet when the corrugated tube is inserted into an insertion aperture of the grommet.
Figure 8B:
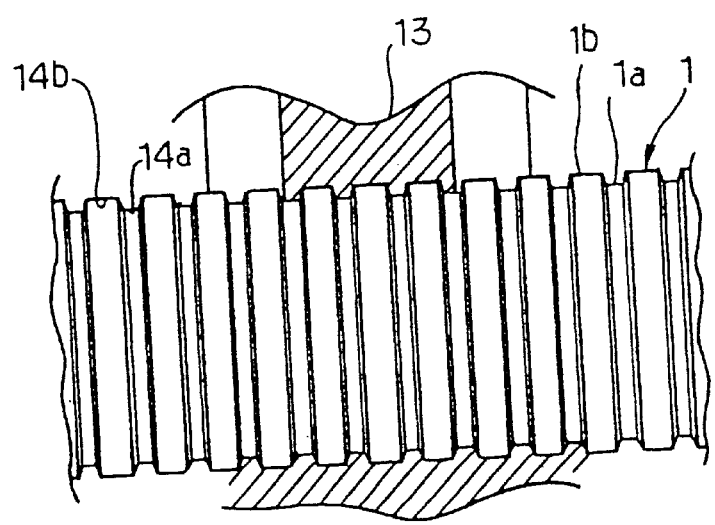

In the embodiment described above, as shown in FIG. 4(a), the upper surfaces of the tongue 28a and 28b, which contact the outer peripheral of the corrugated tube 21, are formed as smooth, curved plates. However, as shown in FIG. 6, the upper surface of the tongue 28a and 28b can have alternating troughs 30a and ridges 30b, as to engage with the circular ridges 21a and the circular troughs 21b of the corrugated tube 21, respectively.

According to the construction of the grommet described above, in addition to fixing the corrugated tube 21 to the tongues 28a and 28b by wrapping tape therearound, the circular ridges 21a and circular troughs 21b respectfully engage with the troughs 30a and ridges 30b formed on the upper surface of the tongues 28a and 28b. Thus, sliding of the corrugated tube 21 against the grommet 23 in the longitudinal direction of the corrugated tube is more positively prevented.

According to the present invention, a slit is provided so as to extend from the upper surface of the grommet body to the insertion aperture of the grommet body. A corrugated tube can be easily mounted into the insertion aperture through the slit by separating the facing opening surfaces of the grommet body on opposite sides of the slit from each other. After the corrugated tube is mounted, the opening surfaces are placed into contact with each other so as to close the slit. Thus, the corrugated tube is prevented from slipping out of the insertion aperture.

Further, the opening surfaces on opposite sides of the slit face one another and are inclined at a predetermined angle with respect to a plane coextensive with the axis of the insertion aperture. In addition, the outer peripheral surface of the grommet 25, in which an engaging recess is provided, has sides that are also inclined at about the same predetermined angle with respect to the plane coextensive with the axis of the insertion aperture. Therefore, when the grommet body engages with an opening in an automobile body panel, the facing opening surfaces on opposite sides of the slit can tightly contact each other. Accordingly, water, moisture and sound are prevented from entering into the insertion aperture through the slit. Thus, waterproofness and soundproofness are not adversely affected.

Further, since the opening surfaces on opposite sides of the slit are inclined at a predetermined angle with respect to a line perpendicular to the axis of the insertion aperture, the slit can be formed as a wide gap. Accordingly, when the grommet body is molded using a die, die cutting for the slit can be performed easily. Thus, the molding operation of the grommet body becomes easier.

Further, since the corrugated tube is fixed to tongues by wrapping tape therearound, the corrugated tube is tightly fixed to the grommet body.

In addition to binding the corrugated tube to the tongues by wrapping tape therearound, circular ridges and circular troughs respectfully engage with the troughs and ridges formed on the upper surface of the tongues. Thus, the corrugated tube is more positively prevented from sliding against the grommet 23 in the longitudinal direction of the corrugated tube.

In the above embodiments, the grommet is provided to receive a corrugated tube having circular ridges and troughs. However, it is possible to use the grommet with a tube which is not corrugated, for example, which may have a smooth side wall. In this case, it is not necessary to provides troughs and ridges in an inner peripheral surface of the grommet.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. HEI 11-147839, filed on May 27, 1999, which is herein expressly incorporated by reference in its entirety.

What is claimed is:

1. A grommet configured to receive a corrugated tube having alternating circular ridges and troughs on an outer periphery of the corrugated tube and configured to be directly mounted in an opening in a panel, the opening having parallel edges, said grommet comprising:

a body having a recess around at least part of an outer peripheral surface thereof and an insertion aperture into which the corrugated tube is insertable, said recess including tapered portions and being engageable with an opening having parallel edges provided in a panel;

at least one alternating trough and ridge provided in an inner peripheral surface of said body around said insertion aperture, said trough and ridge respectively being engageable with one of the circular ridges and troughs of the corrugated tube, a tongue provided on a surface of said body and extending from an edge of the insertion aperture, the corrugated tube being securable to said tongue by a wrapping tape;

said body having a slit extending from said insertion aperture to the outer peripheral surface of the body so that said slit can be opened to easily insert the corrugated tube and closed around the corrugated tube;

facing surfaces of said body on opposite sides of said slit being inclined at a predetermined angle with respect to a line within a plane coextensive with an axis of said insertion aperture; and said tapered portions being inclined at about the predetermined angle with respect to the line so that, when said grommet is not mounted on the panel, said slit is openable for easy insertion of the corrugated tube within said insertion aperture, and when said grommet is mounted in the opening in the panel, said tapered portions engage the parallel edges to force said tapered portions parallel, so that said slit is closed by a force generated by engagement of said tapered portions with the parallel edges so that said facing surfaces tightly contact each other to provide watertight engagement.

2. The grommet according to claim 1, wherein said predetermined angle is set between one and five degrees.

3. The grommet according to claim 1, wherein said tongue has at least one alternating ridge and trough which are respectively engageable with one of the circular troughs and ridges of the corrugated tube.

4. A grommet configured to receive a tube and to be directly mounted in an opening in a panel, the opening having parallel edges, said grommet comprising:

a body having a generally planar portion, a curved portion and tapered portions on the outer peripheral surface thereof, and an insertion aperture configured to receive the tube, each of the tapered portions extending between an end of the planar portion and an end of the curved portion;

at least one tongue provided on a surface of said body and extending from an edge of the insertion aperture, the tube being securable to said tongue by a wrapping tape;

said body having a slit extending from said insertion aperture to the planar portion;

facing surfaces of said body on opposite sides of said slit being inclined at a predetermined angle with respect to a line within a plane coextensive with an axis of said insertion aperture; and said tapered portions being inclined at about the predetermined angle with respect to the line so that, when said grommet is not mounted on the panel, said slit is openable for easy insertion of the tube within said insertion aperture, and when said grommet is mounted in the opening in the panel, said tapered portions engage the parallel edges to force said tapered portions parallel, so that said slit is closed by a force generated by engagement of said tapered portions with the parallel edges so that said facing surfaces tightly contact each other to provide watertight engagement.

5. The grommet according to claim 4, wherein the tube is a corrugated tube having alternating circular ridges and troughs on an outer peripheral surface of the corrugated tube, the grommet further comprising:

at least one alternating ridge and trough provided on an inner peripheral surface of said body around said insertion aperture, said ridge and trough respectively engageable with one of the circular ridges and troughs of the corrugated tube.

6. The grommet according to claim 4, wherein said body further comprises a recess provided around said curved portion and said tapered portions, said recess being engageable with an opening provided in a panel.

7. The grommet according to claim 4, further comprising a plurality of tongues provided on opposite surfaces of the grommet, extending from opposite edges of said insertion aperture.

8. The grommet according to claim 4, wherein the tube is a corrugated tube having alternating circular ridges and troughs on an outer peripheral surface of the corrugated tube, and said tongue includes at least one ridge and trough which are respectively engageable with one of the circular troughs and ridges of the corrugated tube.

9. A method for mounting a corrugated tube, having alternating ridges and troughs in an outer periphery of the corrugated tube, into an insertion aperture of a grommet, the method comprising:

opening a slit provided in the grommet, the slit extending from the insertion aperture to an outer peripheral surface of the grommet, facing surfaces of the grommet on opposite sides of the slit being inclined at a predetermined angle with respect to a line within a plane coextensive with an axis of the insertion aperture;

inserting the corrugated tube into the insertion aperture through the slit;

closing the slit by engaging a recess, provided in the outer peripheral surface of the grommet and including tapered portions inclined at about the predetermined angle with respect to the line, with a panel opening having parallel edges, by mounting the grommet in the panel opening by engaging the tapered portions with the parallel edges to force the tapered portions parallel in a manner such that the slit is closed by a force generated by engagement of the tapered portions with the parallel edges so that the facing surfaces tightly contact each other to provide watertight engagement;

placing the corrugated tube on a tongue provided in a surface of the grommet, an end of the insertion aperture being positioned in the surface; and wrapping a tape around the corrugated tube and the tongue.

10. The method according to claim 9, further comprising engaging one of the alternating ridges and troughs of the corrugated tube with at least one alternating ridge and trough provided on an inner surface of the insertion aperture.

* * * * *